(12) United States Patent
Watanabe et al.

(10) Patent No.: US 8,253,255 B2
(45) Date of Patent: Aug. 28, 2012

(54) ELECTRONIC DEVICE WHICH DISCONNECTS FIRST AND SECOND TERMINALS UPON LAPSE OF A PRESCRIBED DEVICE LIFETIME

(75) Inventors: Hiroshi Watanabe, Yokohama (JP); Kazuya Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 476 days.

(21) Appl. No.: 12/049,715

(22) Filed: Mar. 17, 2008

(65) Prior Publication Data
US 2009/0015074 A1    Jan. 15, 2009

(30) Foreign Application Priority Data
Jul. 12, 2007    (JP) .................................. 2007-183563

(51) Int. Cl.
*H01L 23/48*    (2006.01)
(52) U.S. Cl. .................... 257/777; 257/686; 438/790
(58) Field of Classification Search .................. 257/686, 257/777
See application file for complete search history.

(56) References Cited

U.S. PATENT DOCUMENTS

| | | | |
|---|---|---|---|
| 4,588,901 A | | 5/1986 | Maclay et al. |
| 6,531,773 B2 * | | 3/2003 | Nishizawa et al. ............ 257/723 |
| 7,075,284 B2 * | | 7/2006 | Watanabe et al. .......... 324/76.11 |
| 7,138,712 B2 | | 11/2006 | Heberle et al. |
| 7,343,263 B2 | | 3/2008 | Watanabe et al. |
| 7,630,941 B2 * | | 12/2009 | Berstis ............................. 705/59 |
| 2004/0032244 A1 * | | 2/2004 | Palm et al. .................... 324/71.5 |
| 2006/0087360 A1 | | 4/2006 | Watanabe |
| 2006/0179416 A1 | | 8/2006 | Watanabe |
| 2006/0277324 A1 * | | 12/2006 | Aldereguia et al. ............... 710/1 |
| 2007/0158699 A1 | | 7/2007 | Watanabe et al. |

FOREIGN PATENT DOCUMENTS

| | | |
|---|---|---|
| CN | 1484309 A | 3/2004 |
| JP | 2007-184321 | 7/2007 |
| KR | 10-2006-0063861 | 6/2006 |

OTHER PUBLICATIONS

U.S. Appl. No. 11/853,415, filed Sep. 11, 2007, Hiroshi Watanabe, et al.
U.S. Appl. No. 11/845,337, filed Aug. 27, 2007, Hiroshi Watanabe, et al.
U.S. Appl. No. 11/845,451, filed Aug. 27, 2007, Hiroshi Watanabe.
U.S. Appl. No. 11/856,256, filed Sep. 17, 2007, Daisuke Hagishima, et al.

* cited by examiner

*Primary Examiner* — David Vu
*Assistant Examiner* — Caleb Henry
(74) *Attorney, Agent, or Firm* — Oblon, Spivak, McClelland, Maier & Neustadt, L.L.P.

(57) ABSTRACT

An electronic device includes a substrate, a first chip mounted on the substrate and having a first terminal, a second terminal, an input pad and a semiconductor time switch connected to the first terminal and the second terminal and configured to disconnect the first terminal and the second terminal upon lapse of a prescribed lifetime, the input pad being configured to set the prescribed lifetime, a second chip mounted on the substrate and incorporating an operational device having a third terminal connected to the first terminal and a fourth terminal serving as an input terminal for an external device, a first memory device mounted on the substrate, having a fifth terminal connected to the second terminal and storing information required for operating the operational device, and an encapsulater covering at least the input pad of the first chip.

9 Claims, 8 Drawing Sheets

|  | Forget | | Remember | |
|---|---|---|---|---|
|  | p-MOSFET | n-MOSFET | p-MOSFET | n-MOSFET |
| Type | Normally Off | | Normally On | |
| Switch | On→Off | | Off→On | |
| Charge | Electron | Hole | Hole | Electron |

ELECTRONIC DEVICE WHICH DISCONNECTS FIRST AND SECOND TERMINALS UPON LAPSE OF A PRESCRIBED DEVICE LIFETIME

CROSS-REFERENCE TO RELATED APPLICATIONS

This application is based upon and claims the benefit of priority from prior Japanese Patent Application No. 2007-183563, filed Jul. 12, 2007, the entire contents of which are incorporated herein by reference.

BACKGROUND OF THE INVENTION

1. Field of the Invention

The present invention relates to an electronic device which can be attached to an industrial product and in which the manufacturer of the industrial product can set a use period of the industrial product.

2. Description of the Related Art

The lifetime of any industrial product depends how its major components are degraded with time. The components differ from one another in terms of lifetime. Hence, the industrial product may be used after its valid use period as long as the product works well, even if some of its components have ceased to function.

As long the use of as such an industrial product causes no safety problems, the user need not be worry so much. Assume that the component that has first ceased to function is a safety device. This means that the user is using a product without a safety device. It should be noted that the safety device may be related to gas-leakage detection, car braking or fire prevention.

A technique of limiting the use period of a product by using a timer is disclosed in, for example, U.S. Pat. No. 4,588,901. A timer may be mounted on an electronic board, so that the product may be disabled upon laps of, for example, ten years. In this case, however, the product can be used longer than ten years only if power supply is disconnected from the timer, thereby stopping the timer.

To prevent such an overuse of a product, it is desired that an electronic device be provided, which can control, without using batteries, the lifetime of the microcomputer or electronic board incorporated in the product.

BRIEF SUMMARY OF THE INVENTION

According to one aspect of the invention, there is provided an electronic device which includes:

a substrate;

a first chip mounted on the substrate and having a first terminal, a second terminal, an input pad and a semiconductor time switch connected to the first terminal and the second terminal and configured to disconnect the first terminal and the second terminal upon lapse of a prescribed lifetime, the input pad being configured to set the prescribed lifetime;

a second chip mounted on the substrate and incorporating an operational device having a third terminal connected to the first terminal and a fourth terminal serving as an input terminal for an external device;

a first memory device mounted on the substrate, having a fifth terminal connected to the second terminal and storing information required for operating the operational device; and an encapsulater covering at least the input pad of the first chip.

DETAILED DESCRIPTION OF THE INVENTION

Before describing embodiments of this invention, a semiconductor time switch without a power source (i.e., solid-state aging device, SSAD) used in the present invention will be described. A part of this invention resides in effectively using the function of an aging device (disclosed in U.S. Pat. No. 7,224,157) issued to the present applicant.

Figure 9A:
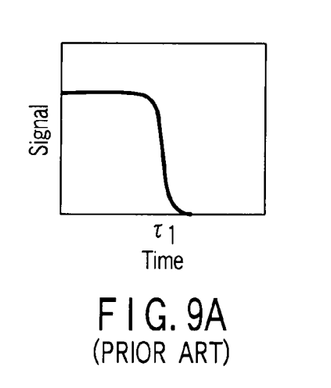
FIGS. 9A to 9D are diagrams representing four signal-time characteristics that an aging device may have.
Figure 9B:
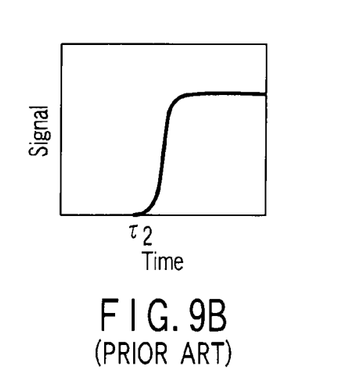
Figure 9C:
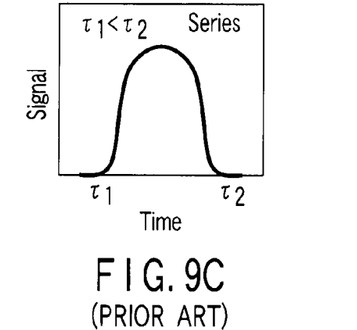
Figure 9D:
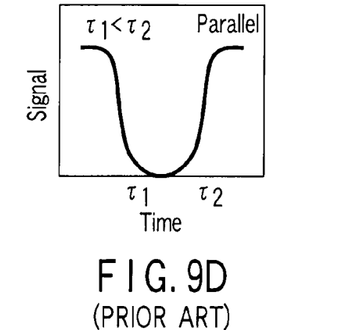

FIGS. 9A to 9D explain the four basic functions of the aging device utilized in the present embodiment. FIG. 9A shows the case where as time passes, a signal ceases to exist when the lifetime ($\tau 1$) of the aging device expires. FIG. 9B shows the case where a signal is generated when as time passes, the lifetime ($\tau 2$) of the aging device expires. FIG. 9C shows the case where as time passes, a signal is generated when the lifetime ($\tau 1$) of the aging device expires and then ceases to exist when the lifetime ($\tau 2$) longer than the lifetime ($\tau 1$) expires. FIG. 9D shows the case where as time passes, a signal ceases to exist when the lifetime ($\tau 1$) of the aging device expires and a new signal is generated when the lifetime ($\tau 2$) longer than the lifetime ($\tau 1$) expires.

Figure 10:
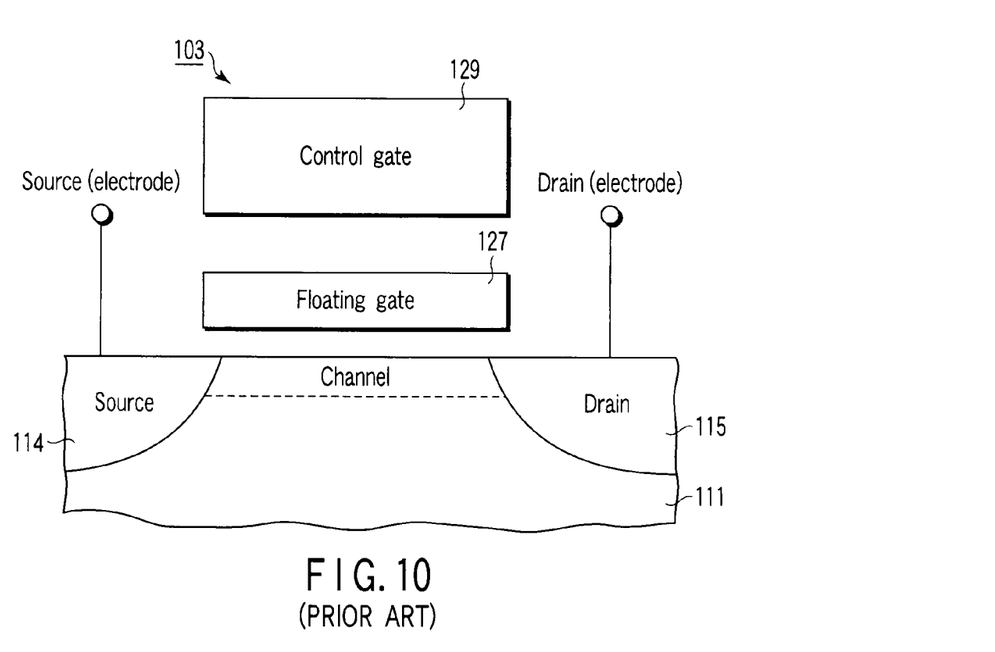
FIG. 10 is a sectional view of an aging device of floating gate type.

The sectional view of FIG. 10 shows one of the unit cells which are provided in an aging device (SSAD) 103 and which have a floating gate 127. For the sake of simplicity of illustration, the gate insulating film (tunnel insulating film) or the inter-layer insulating film are not shown in FIG. 10. The insulating film (not shown) surrounds the floating gate 127.

To embed the SSAD and the memory cells in one chip, the SSAD should have a structure similar to that of the memory-cell transistors in order not to complicate the manufacturing process. To this end, in most SSADs, the thinnest part of the insulating film surrounding the floating gate of each unit cell (usually, the insulating film provided between the channel and the tunnel insulating film) is few nanometers. Therefore, data can be written (or the SSAD can be initialized) in the same way as in NAND flash memories and NOR flash memories. That is, data can be written by either FN tunnel injection or hot-electron injection.

Figure 11:
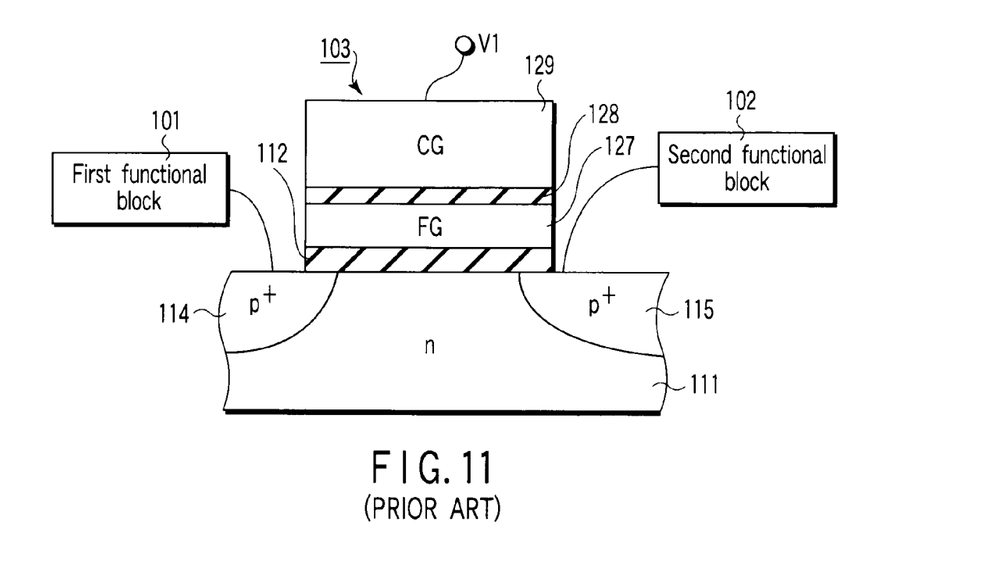
FIG. 11 is a diagram explaining a method of writing data in the aging device.

A method of writing data in the aging device will be explained, with reference to FIGS. 11 to 15. As shown in FIG. 11, the aging device 103 comprises an n-type semiconductor substrate, a gate insulating film 112 formed on the substrate 111, a floating gate 127 formed on the gate insulating film 112, an insulating film 128 formed on the floating gate 127, and a control gate 129 formed on the insulating film 128. A p+ source region 114 and a p+ drain region 115 are formed in the substrate 111, as sandwiching the gate insulating film 112. The control gate 129 is connected to an external terminal. The aging device is thus configured.

The source region 114 of the aging device 103 is connected to a first functional block 101 that is a memory cell or an MPU. The drain region 115 is connected to a second functional block 102 that is, for example, a decoder.

Figure 12:
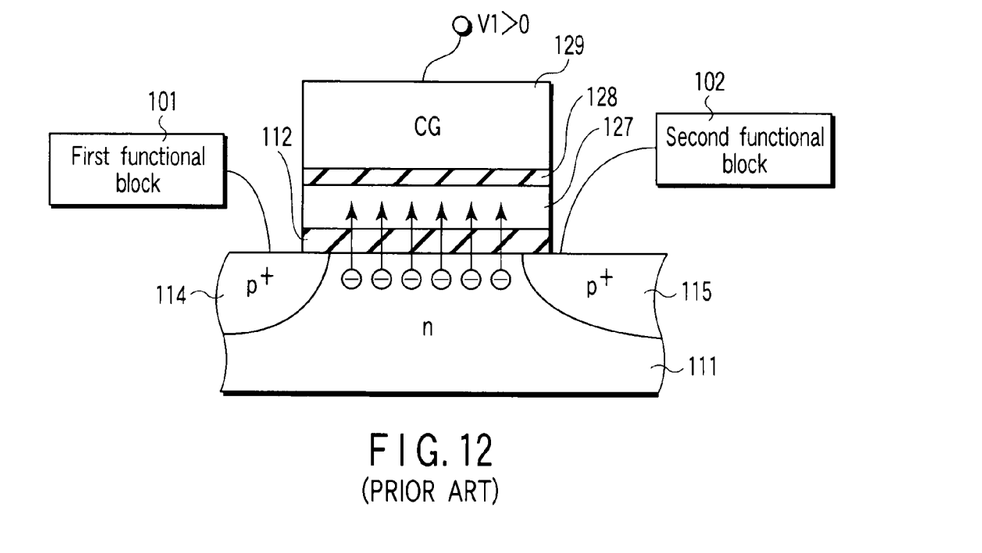
FIG. 12 is a diagram explaining a method of writing data in the aging device.

FIG. 12 is a diagram explaining a method of injecting electrons into the floating gate 127 of the aging device 103. First, a positive voltage V1 (>0) is applied to the control gate 129. FN tunneling is thereby induced, injecting electrons from the n-type semiconductor substrate 111 into the floating gate 127.

Figure 13:
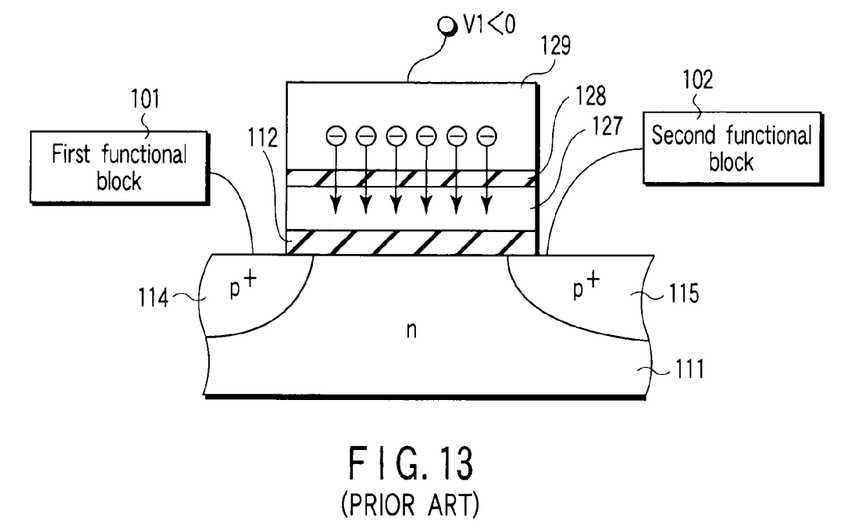
FIG. 13 is a diagram explaining another method of writing data in the aging device.

FIG. 13 is a diagram explaining another method of injecting electrons into the floating gate 129. In this method, a negative voltage V1 (<0) is applied to the control gate 129. FN tunneling is thereby induced, injecting electrons from the control gate 129 into the floating gate 127.

Thus, electrons can be injected into the floating gate 127 if voltage V1 is high enough to induce FN tunneling, no matter whether it is a positive voltage or a negative voltage.

If the gate insulating film 112 provided between the floating gate 127 and the semiconductor substrate 111 is sufficiently thin, or if the insulating film 128 provided between the control gate 129 and the floating gate 127 is sufficiently thin, electrons can be injected, directly by virtue of the tunneling.

In most aging devices, a logic circuit and a memory are embedded together. In the aging device 103, too, electrons are injected into the floating gate 127 in accordance with an instruction given from, for example, a control circuit via a wiring line provided in an integrated circuit chip.

After the electrons have been so injected, the application of voltage V1 to the control gate 129 is stopped. Alternatively, the terminal may be physically removed and the aging device 103 is packaged. As a result, electrical conduction is achieved between the source region 114 and the drain region 115 even if voltage V1 is zero. Thus, the aging device 103 becomes conducting. It is to be noted that the aging device 103 works without a power source as a time switch.

Figure 14:
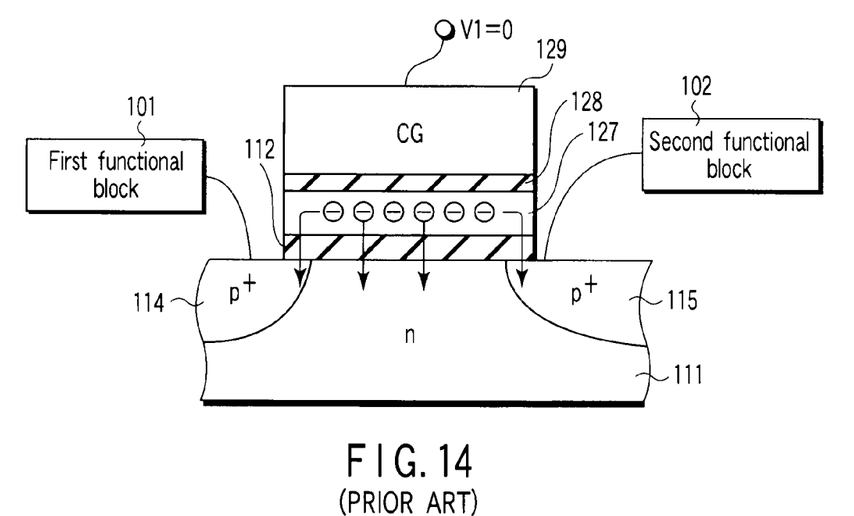
FIG. 14 is a diagram explaining the method of writing data in the aging device.
Figure 15:
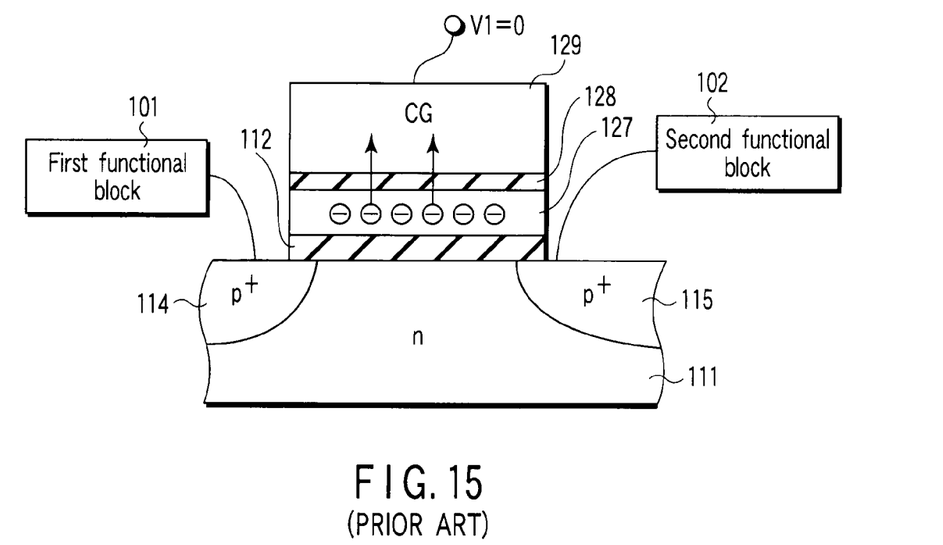
FIG. 15 is a diagram explaining the method of writing data in the aging device.

Next, as FIGS. 14 and 15 show, electrons move from the floating gate 127 into the semiconductor substrate 111, source region 114 and drain region 115 as shown in FIG. 14 and into the control gate 129 as shown in FIG. 15, because of the leakage current attributed to the direct tunneling. Hence, the electric field applied to the channel decreases with time. The channel eventually ceases to be inverted at all. At this time, a current no longer flows between the source region 114 and the drain region 115. In other words, the aging device is turned off.

Many electrons are released as shown in FIG. 14 if the gate insulating film 112 provided between the floating gate 127 and the semiconductor substrate 111 is thinner than the insulating film 128 provided between the floating gate 127 and the control gate 129. If the insulating film 128 provided between the floating gate 127 and the control gate 129 is thinner than the gate insulating film 112 provided between the floating gate 127 and the semiconductor substrate 111, many electrons are released as shown in FIG. 15. If the insulating film 128 and the gate insulating film 112 are as thin as each other, the electrons released are equivalent to the sum of the leakage currents flowing in the insulating film 128 and gate insulating film 112, respectively.

The valid lifetime of the aging device 103, i.e., the period at the end of which the aging device is turned off, is proportional to the number of electrons accumulated in the floating gate 127 and is inversely proportional to the diffusion current and the direct tunnel-gate leakage. Hence, the valid lifetime of the aging device 103 can be set within a prescribed range by adjusting the electron-injecting time, gate volume, junction area, junction density, thickness of each insulating film, channel area, size of the extension region, and the like.

The n-type semiconductor substrate may be replaced by a p-type semiconductor substrate, and the p-type source and drain, which are p-type diffusion layers, may be replaced by n-type source and drain, which are n-type diffusion layers, to provide the aging device 103. In this case, a positive charge (electrons released by FN tunneling) is first applied to the floating gate, and a positive charge (electrons released by direct channeling) is applied from the floating gate 127. The aging device 103 remains unchanged in both the operating principle and structure. Further, a memory element of so-called SONOS structure, which has a charge storage layer such as a silicon nitride, may be used in place of the floating gate 127.

Figure 16:
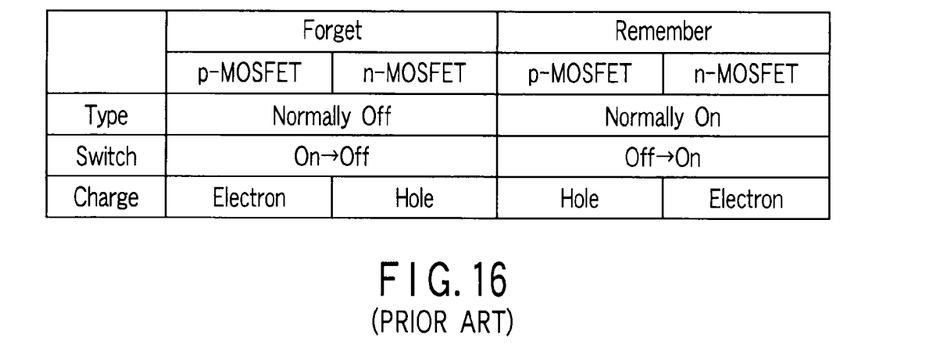
FIG. 16 is a diagram explaining the type of the aging device.

As pointed out above, this time-based change is not accomplished solely by the above-explained method. Rather, it can be accomplished by various methods. Four methods are available as shown in FIG. 16. One of these methods is selected in accordance with the type of transistors used. A normally-on-type transistor performs the function of "remember (the case shown in FIG. 9B)" in an aging device. A normally-off-type transistor performs the function of "forget (the case shown in FIG. 9C" in an aging device.

Any normally-off-type transistor is turned on when electrons are accumulated in the floating gate (thus, data is written if the transistor is a pMOSFET) or when holes are accumulated in the floating gate (thus, data is written if the transistor is an nMOSFET), whereby the channel is reversed. Thereafter, electrons or holes moves from the floating gate as time passes. Finally, the normally-off-type transistor is turned off. The time the transistors are turned off is the end of the lifetime of a normally-off-type SSAD.

By contrast, any normally-on-type transistor is turned off when electrons are accumulated in the floating gate (thus, data is written if the transistor is an nMOSFET) or when holes are accumulated in the floating gate (thus, data is written if the transistor is a pMOSFET), whereby the channel is turned off. Thereafter, the charge leaks from the floating gate as time passes. Finally, the normally-off-type transistor is turned on.

The time at which the transistors are turned on is the end of the lifetime of a normally-on-type SSAD.

As indicated above, the lifetime of an SSAD can be adjusted by changing the thickness of the tunnel film. The lifetime may be adjusted by another method, utilizing the specific structure of the floating gate. Thus, the function of FIG. 9A corresponds to the function of an SSAD of the normally-off type, and the function of FIG. 9B corresponds to the function of an SSAD of the normally-on type.

Figure 17:
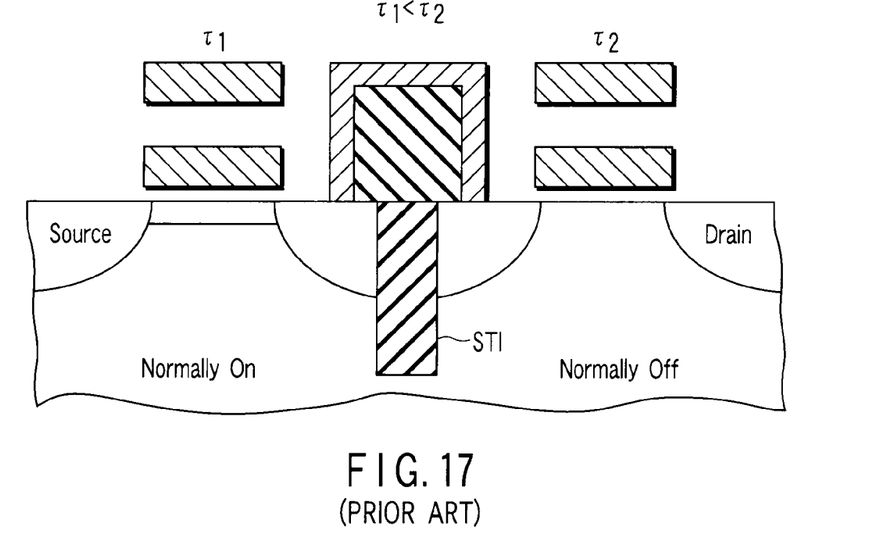
FIG. 17 is a sectional view of an aging device that remains on for only a preset time.

FIG. 17 is a sectional view of an aging device that performs the function of FIG. 9C. As FIG. 17 shows, a normally-on-type cell is provided on the left side, and a normally-off-type cell is provided on the right side. The aging-device cells thus arranged share one diffusion layer or are connected by, for example, a metal line as shown in FIG. 17. The cells are thereby connected in series. This is a characterizing feature of the aging device.

So long as the normally-on-type cell and the normally-off-type cell, which make a cell pair, are connected in series, the normally-on cells may be connected in parallel and the normally-off cells may be connected in parallel. Moreover, the cells arranged parallel on the left side and the cells arranged on the right side may differ in number. Such an extension may be required in some cases in order to control the lifetime of the aging device.

In the structure shown in FIG. 17, the normally-on-type cell provided on the left has lifetime $\tau 1$, and the normally-off-type cell provided on the right has lifetime $\tau 2$. In the structure shown in FIG. 18, the normally-on-type cells connected in parallel on the left have lifetime $\tau 1$, and the normally-off-type cells connected in parallel on the right have lifetime $\tau 2$. Lifetime $\tau 1$ is shorter than lifetime $\tau 2$. Note that $\tau 1$ is the first lifetime and $\tau 2$ is the second lifetime.

The normally-on-type cells having lifetime $\tau 1$ and the normally-off-type cells having lifetime $\tau 2$ may be connected in parallel on the condition that $\tau 1$ is shorter than $\tau 2$, ($\tau 1 < \tau$). Then, the function shown in FIG. 9D can be attained.

Figure 18:
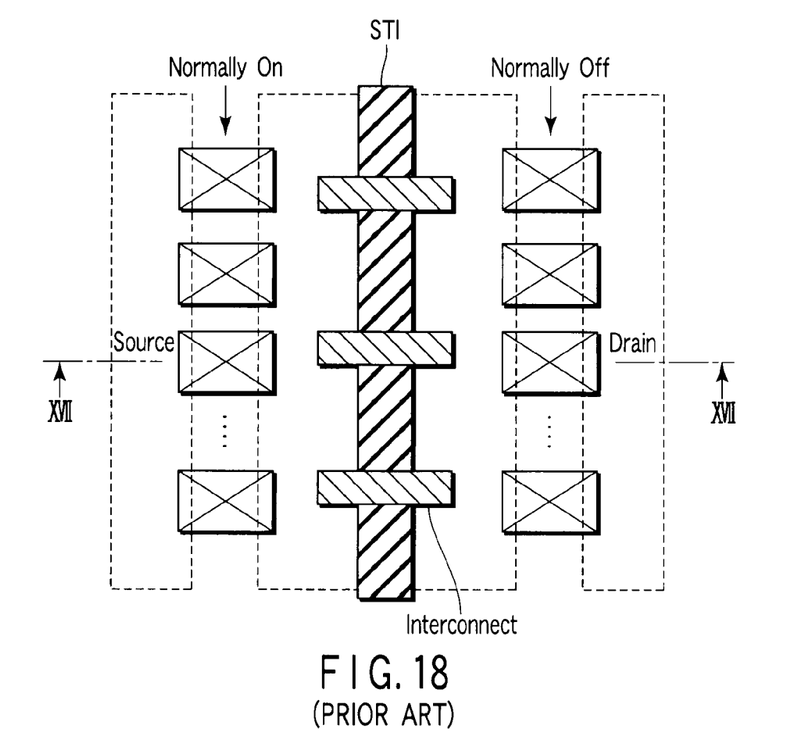
FIG. 18 is a top view of the aging device configured by connecting a plurality of cells in parallel and remaining on for only a preset time, showing line XVII-XVII along which the sectional view of FIG. 17 has been taken.

With all functions shown in FIGS. 9A to 9D, it is possible to enhance the controllability of lifetime by connecting groups of cells that are of the same type and similar in lifetime. FIG. 18 is a diagram showing how cells may be connected. Series circuits, each composed of cells connected in series, may be connected in parallel. The series-connected cells and the parallel-connected cells may be combined in various ways. Whichever way the cells are combined, the controllability of lifetime can be enhanced.

The four basic functions of the aging device have been described, with reference to an SSAD of the type that has floating gates. Similar four basic functions can, of course, be achieved not only in, as pointed out above, NAND flash memories, NOR flash memories and EEPROMs, each having floating gates, but also in SSADs utilizing various novel memories, magnetic memories and DVD- and CD-type media.

(First Embodiment)

Figure 1:
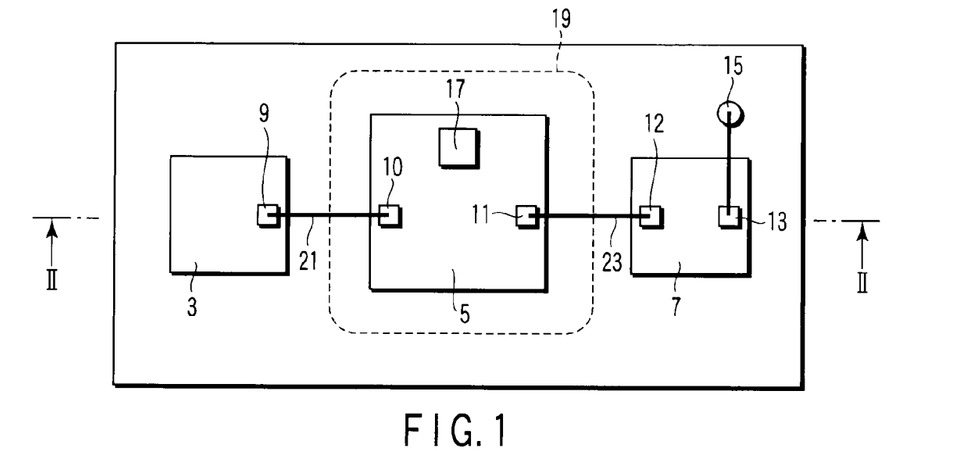
FIG. 1 is a plan view of an electronic device according to a first embodiment.
Figure 2:
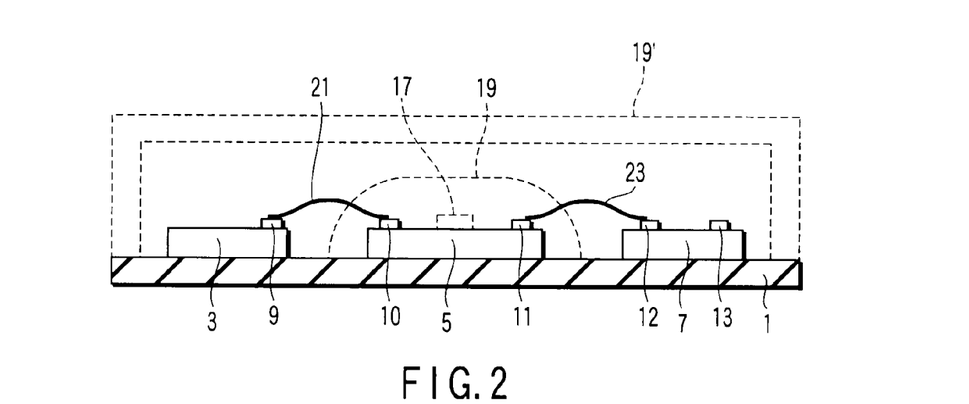
FIG. 2 is a sectional view taken along line II-II shown in FIG. 1.

As shown in FIGS. 1 and 2, an electronic device according to a first embodiment comprises a substrate 1, a read-only memory (ROM) 3, an aging device 5, and an operational device or micro-processing unit (MPU) 7. The substrate 1 is made of resin, ceramic or the like. The ROM 3, aging device 5 and MPU 7 are mounted on the substrate 1. The aging device 5 has first and second terminals 10 and 11. The first terminal 10 and the second terminal 11 are disconnected when a time elapses, which has been preset via an input pad 17 and during which no power is supplied to the aging device 5.

The first terminal 10 is electrically connected to the connection pad 9 of the ROM 3 by the known method using a wire or the like. The second terminal 11 is electrically connected to the connection pad 12 of the MPU 7.

The ROM 3 stores information, such as token that drives the MPU 7. At the initial stage of operation the ROM 3 remains disconnected from the MPU 7. Assume that the electronic device shown in FIGS. 1 and 2 is attached to an industrial product. Immediately before shipping the industrial product, the manufacturer writes a preset use period (lifetime) of the product in the SSAD 5 through the input pad 17. Then, the ROM 3 and the MPU 7 remain mutually connected during the use time. The output of the MPU 7 is supplied to the industrial produce through an output terminal 13 and an external output means 15 connected to the output terminal 13. The industrial product can therefore operate. The external output means 15 may be a terminal for connecting a conductive wire, but it may be a wireless output device.

The aging device (SSAD) 5 is capped with encapsulating member 19 such as epoxy resin after the preset use period has been written into it through the input pad 17. Thereafter, the input terminal 17 cannot be accessed at all. Instead of the encapsulating member 19, a cap 19' may be used, covering the entire substrate 1. It suffices if the input terminal 17 is sealed from outside.

It should be noted that the SSAD 5 is not embedded in any other function region (e.g., ROM) as the aging device disclosed in U.S. Pat. No. 7,224,157. The SSAD 5 is mounted, as an independent chip, on an electronic board or a mother board. The SSAD 5 is connected to the other function regions by the external output means 15, at the time the manufacturer ships the industrial product. The manufacturer can therefore set whichever use period they desire.

More specifically, the lifetime that the SSAD 5 according to this embodiment must control is equal to or longer than ten years, while the lifetime that the conventional SSADs must control is at most one year. Ordinary semiconductor nonvolatile memory cells can hold data but for less than ten years in most cases, in view of the characteristic differences statistically reported. This is mainly because the insulating films (tunnel films) that directly influence the lifetime control gradually are degraded in reliability as data is repeatedly written in and read from the semiconductor memory.

Data need not be written in or read from the SSAD 5 according to the present embodiment, until the use of the industrial product is terminated (until, for example, 15 years elapses), once the lifetime has been set. This means that the durability problem of the tunnel films need not be taken into consideration. Hence, it is sufficient to provide an SSAD in the form of a chip independent of any general-purpose memory, which needs not be so durable if its lifetime is long.

The SSAD 5 provided as an independent chip has another advantage. That is, the tunnel films can be thick or should rather be thick. In any general-purpose memory, the tunnel films must be small and thin to suppress the cell interference or the difference in threshold value between the cells. In the SSAD 5 according to this embodiment that should have a lifetime of ten years or more, each cell must have a tunnel film at least 10 nm thick, preferably at least 13 nm thick if it has a floating gate, or a tunnel film at least 7 nm thick, preferably at least 10 nm thick if it has a charge storage layer (SONOS). In view of this, too, it is advantageous to provide the SSAD 5 an independent chip. Note that the above-mentioned tunnel film thickness is the thickness of the thinnest part of the insulating film surrounding the floating gate or the charge storage layer, and that this thinnest part is a tunnel film in most cases.

As can be seen from FIG. 1, the MPU 7 cannot receive the token and ceases to operate when the SSAD 5 inhibits the MPU 7 from accessing the ROM 7. Thus, the period during which the SSAD 5 remains on is a period or lifetime during which the industrial product can safely operate.

The lifetime to be set in the SSAD 5 is based on how those components of the product, which greatly influence safety, degrade with time. Hence, the lifetime differs from one product to another. In view of this, the value of the lifetime is not so important to be discussed. The lifetime may be, for example, 15 years.

The present embodiment is characterized in another respect. That is, the manufacturer seals the input pad 17 with the encapsulating member 19 or the cap 19' after the product lifetime has been set via the input pad 17. To set a different lifetime in the SSAD 5, the encapsulating member 19 or the cap 19' must be removed. It is impossible to remove the encapsulating member 19 or the cap 19' without damaging the input pad 17. This prevents a third party from changing the lifetime.

As has been described, a semiconductor time switch that can control the lifetime of an industrial product, without using a battery, is used in the first embodiment, thereby to terminate the use of the industrial product. The switch can therefore minimize damages to the user, if any, resulting from an accident that occurs during the use of the product.

(Second Embodiment)

Figure 3:
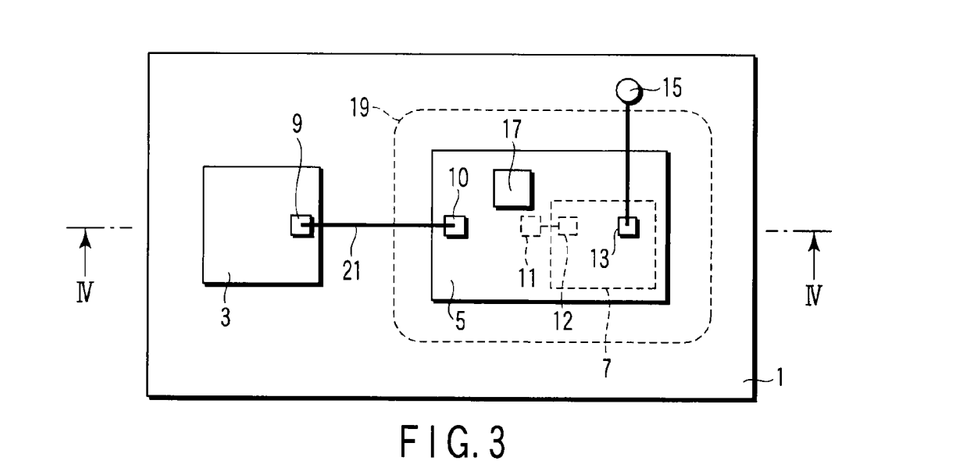
FIG. 3 is a plan view of an electronic device according to a second embodiment.
Figure 4:
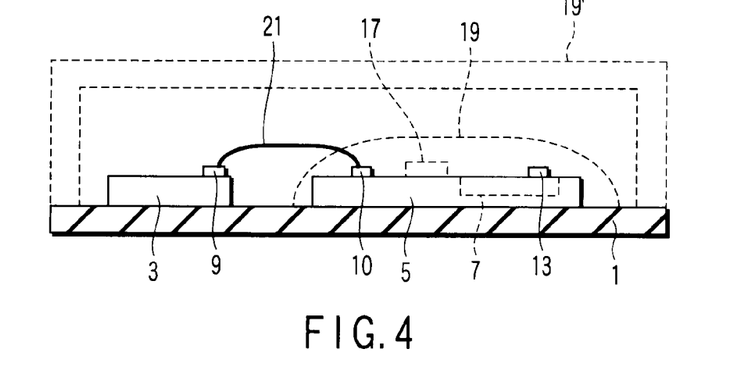
FIG. 4 is a sectional view taken along line IV-IV shown in FIG. 3.

An electronic device according to a second embodiment of this invention will be described, with reference to FIGS. 3 and 4. The components identical to those of the first embodiment are designated by the same reference numbers and will not be described in detail.

This electronic device comprises a substrate 1, a read-only memory (ROM) 3, and an aging device 5. The substrate 1 is made of resin, ceramic or the like. The ROM 3 and aging device 5 are mounted on the substrate 1. The aging device 5 incorporates an operational device or microprocessing unit (MPU) 7. The device 5 has a first terminal 10 and a second terminal 11 connected to the MPU 7. The first terminal 10 and the second terminal 11 are disconnected when a time elapses, which has been preset via an input pad 17.

The first terminal 10 is electrically connected to the connection pad 9 of the ROM 3 by the known method. The ROM 3 stores information, such as token that drives the MPU 7. At the initial stage of operation, the ROM 3 remains disconnected from the MPU 7. Assume that the electronic device shown in FIGS. 1 and 2 is attached to an industrial product. Immediately before shipping the industrial product, the manufacturer writes a preset use period (lifetime) of the product into the SSAD 5 through the input pad 17. During the use period thus written, the ROM 3 and the MPU 7 remains mutually connected. The output of the MPU 7 is supplied to the industrial product through an external output means 15. The industrial product can therefore operate.

In the second embodiment, the MPU 7 is embedded in the same chip as the SSAD 5 is embedded. To embed the MPU 7 and the SSAD 5 in one chip, the SSAD 5 must be a CMOS-embedded one. This is because in a CMOS-embedded SSAD, the floating gate of each cell is shaped like T and the lifetime can be set in terms of the ratio in length between the shorter part and the longer part of the floating gate. (See JP-A 2007-184321 [KOKAI]) The second embodiment can achieve the same advantages as the first embodiment, because the MPU 7 is embedded in the SSAD 5, though it is simpler than the first embodiment in configuration.

(Third Embodiment)

Figure 5:
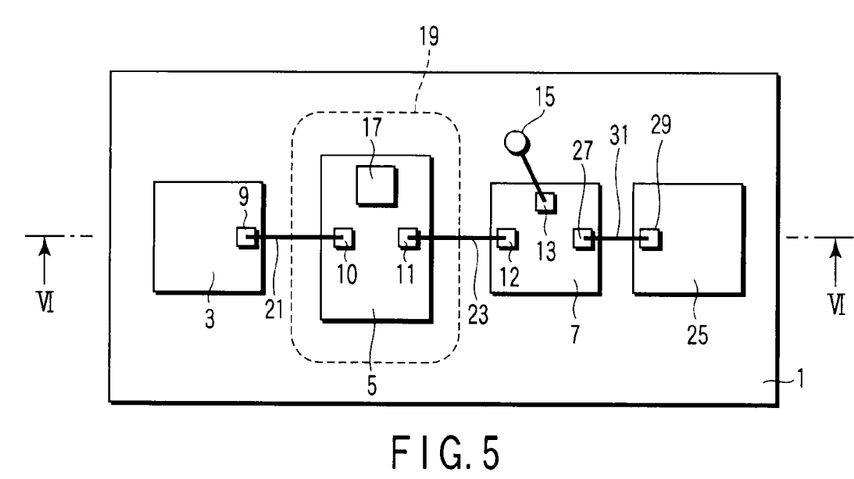
FIG. 5 is a plan view of an electronic device according to a third embodiment.
Figure 6:
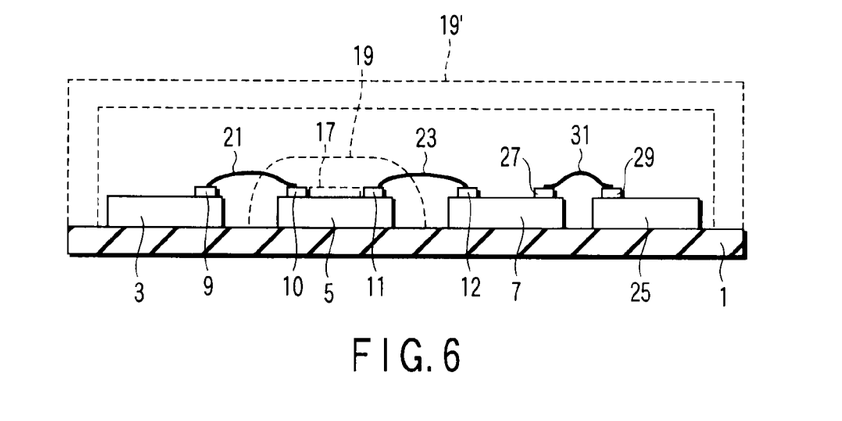
FIG. 6 is a sectional view taken along line VI-VI shown in FIG. 5.

An electronic device according to a third embodiment will be described, with reference to FIGS. 5 and 6. The components identical to those of the first and second embodiments are designated by the same reference numbers and will not be described in detail.

More precisely, this electronic device comprises a substrate 1, a first read-only memory (ROM) 3, an aging device 5, an operational device or microprocessing unit (MPU) 7, and a second read-only memory (ROM) 25. The substrate 1 is made of resin, ceramic or the like. The first ROM 3, aging device 5 and second ROM 25 are mounted on the substrate 1. The MPU 7 has a terminal 27, and the second ROM 25 has a terminal 29. The terminals 27 and 29 are connected, whereby the MPU 7 and the second ROM 25 are connected to each other.

In the third embodiment, a serial number A and a serial number B, which are encrypted data items and recorded in the first and second ROMs 2 and 25, respectively, are used in place of the information, such as token, used in the first embodiment. The MPU 7 operates only while the serial numbers A and B remain identical during a use period of the industrial product to which the device is attached, i.e., the lifetime that is controlled by the aging device (SSAD) 5. The MPU 7 stops operating when the serial numbers A and B become different or when the serial number A becomes unable to be read. As mentioned above, the serial numbers A and B are encrypted. This is because if they are not encrypted, the lifetime of the industrial product can be easily changed by connecting a memory chip holding the serial numbers A and B to the MPU 7.

In any other respect, the third embodiment is identical to the first embodiment. Therefore, anything identical to the first embodiment will not be explained. The third embodiment can attain the same advantages as the first embodiment.

(Fourth Embodiment)

Figure 7:
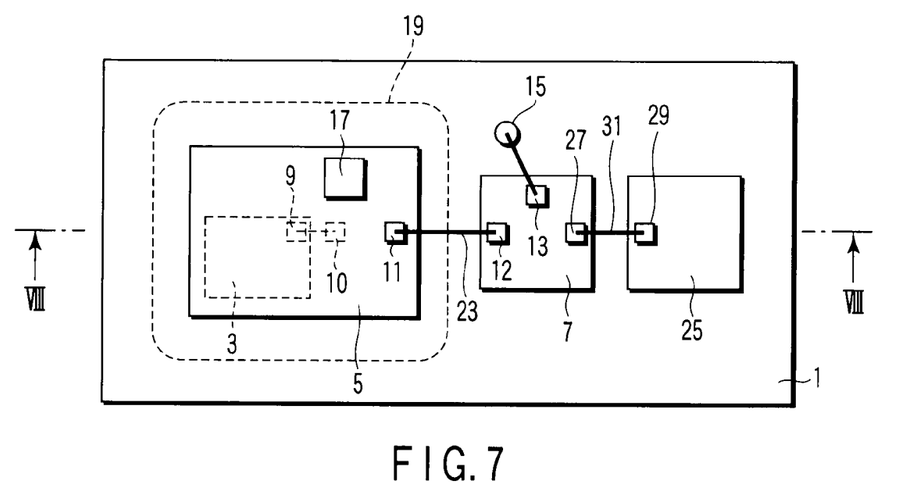
FIG. 7 is a plan view of an electronic device according to a fourth embodiment of this invention.
Figure 8:
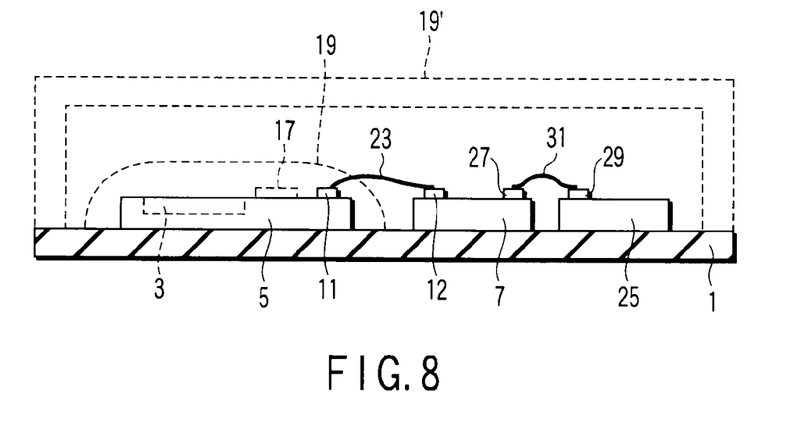
FIG. 8 is a sectional view taken along line VIII-VIII shown in FIG. 5.

An electronic device according to a fourth embodiment of this invention will be described, with reference to FIGS. 7 and 8. The components identical to those of the first to third embodiment are designated by the same reference numbers and will not be described in detail.

More precisely, this electronic device comprises a substrate 1, an aging device 5, an operational device or microprocessing unit (MPU) 7, and a second read-only memory (ROM) 25. The substrate 1 is made of resin, ceramic or the like. The aging device 5, MPU 7 and ROM 25 are mounted on the substrate 1. The aging deice (SSAD) 5 incorporates a first read-only memory (ROM) 3. The device therefore has a simple configuration. The first ROM 3, in which gate insulating films may be thick, can be easily embedded in the SSAD 5.

As indicated above, the first memory 3 is embedded in the MPU 7 in the fourth embodiment. The fourth embodiment can therefore be simpler in structure than the third embodiment and can yet achieve the same advantages as the third embodiment.

The first to fourth embodiment described above has a read-only memory (ROM). The ROM can be replaced by a non-volatile memory chip that holds a charge longer than the lifetime of the product. Most general-purpose memories cannot hold a charge longer then the lifetime of the product. This may be why a ROM is used in most cases.

As has been described, the embodiments of this invention use a semiconductor time switch that can control the lifetime of an industrial product, without using a battery. Hence, each embodiment can terminate the use of an industrial product, thereby minimizing damages to the user of the product resulting from an accident that occurs during the use of the product.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
a substrate;
a first chip mounted on the substrate and including a first terminal, a second terminal, and an input pad, the first chip formed as a semiconductor time switch to connect the first terminal to the second terminal during a prescribed lifetime and to disconnect the first terminal and the second terminal upon lapse of the prescribed lifetime, the prescribed lifetime have been previously written into the first chip;
a second chip mounted on the substrate and including a third terminal connected to the first terminal, a fourth terminal provided as an input terminal for an external device, and an operational device to perform a predetermined operation conditioned upon receipt of an information token;
a first memory device mounted on the substrate including a fifth terminal connected to the second terminal and storing the information token for operating the operational device; and
an encapsulating member capping the first chip at a portion above the substrate and at least the input pad of the first chip so that the input pad is not accessible at all through any contact wire and is completely sealed from outside from any contact wire.

2. The electronic device according to claim 1, further comprising a sixth terminal provided on the second chip and a second memory device including a seventh terminal connected to the sixth terminal, wherein the first memory device comprises means for storing a first encrypted serial number and the second memory device comprises means for storing a second encrypted serial number.

3. The electronic device according to claim 2, wherein the first memory device and the second memory device are read-only memories.

4. The electronic device according to claim 2, wherein the first memory device and the second memory device are semiconductor memory chips.

5. The electronic device according to claim 2, wherein the first memory device and the second memory device are magnetic memory devices.

6. The electronic device according to claim 1, wherein the first chip includes a cell transistor having a floating gate, and a thinnest part of an insulating film surrounding the floating gate is at least 10 nm thick.

7. The electronic device according to claim 1, wherein the first chip includes a cell transistor having a charge storage layer, and a thinnest part of a insulating film surrounding the charge storage layer is at least 7 nm thick.

8. The electronic device according to claim 1, wherein the first chip is a solid-state aging device that includes a pair of diffusion layers provided on a semiconductor substrate as the first terminal and the second terminal, a charge storage portion provided above the semiconductor substrate between the pair of diffusion layers and a control gate provided above the charge storage portion.

9. The electronic device according to claim 1, wherein the second chip is a micro-processing unit including the operational device.

* * * * *